May 10, 1927.

E. GRISSINGER 1,628,242

SOUND VIBRATION TRANSLATING DEVICE

Filed Aug. 18, 1923

INVENTOR
Elwood Grissinger

BY
George C. Dean
ATTORNEY

Patented May 10, 1927.

1,628,242

UNITED STATES PATENT OFFICE.

ELWOOD GRISSINGER, OF BUFFALO, NEW YORK.

SOUND-VIBRATION-TRANSLATING DEVICE.

Application filed August 18, 1923. Serial No. 658,009.

My present invention is shown as embodied in a phonographic reproducer sound box, but its novel features concern more particularly the frictionless, noiseless pivoting or poising for vibration about a rigidly fixed axis, of a lever which is required to faithfully transmit high frequency vibrations, particularly complex vibrations corresponding to speech, music and other sound waves. The pivotal mountings which I employ for this purpose are applicable for recording, relaying, amplifying or other translating devices involving the use of vibratory levers of the above type.

My present invention embodies in improved form the novel features set forth in my copending application Serial No. 404,-60, allowed July 24, 1923, in that I employ rigid bearings on the box and lever respectively, preferably cone bearings on the box engaging bearing surfaces on the lever, the latter being preferably concave. This affords what may be termed two point bearing, although in practice the so-called points are likely to be minute area surfaces of rocking engagement. The bearing surfaces are powerfully forced into continuous nonslip noiseless engagement by means arranged to apply the required powerful pressure, but in such manner as not to afford any material opposition to the pivotal movements of the lever. In combination with such pressure means for the bearings I employ, entirely separately therefrom, adjustable means for resiliently opposing pivotal displacement of the lever, preferably in both directions from a predetermined normal, and for resiliently restoring the lever to normal after such displacement. In the present embodiment of my invention the bearing pressure is applied approximately in the line of the pivotal axis so that whatever bearing spring function is desirable can be afforded by slight and even microscopic elastic yielding of the stiff steel pressure elements under the high initial stress. Such resilience will be sufficient to prevent relaxation of the bearing pressure when the parts expand or contract under heat or cold. An absolute perfect rigidity of the parts applying the bearing pressure being undesirable for this and other reasons, I prefer to localize whatever yield there is in one of the bearing pressure members, preferably a stiff steel member having the bearing pressure applied transversely at a point where it has no rigid backing and is free to flex the minute distance required to set a powerful elastic stress. However, the geometry of the arrangement is such that the unavoidable elasticity of the steel may afford sufficient elasticity, even when the structure of the pressure applying elements is designed to be as rigid as possible.

The restoring springs are arranged in oppositely acting pairs and there are preferably two pairs of these opposing springs, one pair on each side of the pivotal axis.

An important feature of my present invention consists in anchoring these opposing springs on a rotatable bar which can be unclamped and permitted to rotate to a position of equal tension of the opposing springs and can then be clamped, after which the tensions of the individual springs must be separately adjusted to secure a desired predetermined normal position for the free ends of the lever and a desired predetermined resilient opposition and restoring effect with reference to its vibratory movements in either direction.

In most cases levers of this type will have the end of the longer arm rigidly attached to an acoustic diaphragm, either to actuate the diaphragm as in the reproducer or to be actuated by the diaphragm as in the recorder. In this combination, the movements of the lever are capable of being influenced by three resilient elements, namely, the diaphragm to which its free end is attached; the more or less resilient members for maintaining powerful pressure on the bearings, which for convenience we will call bearing pressure means; and the last-mentioned resilient means, which for convenience we have called restoring spring means.

For best results, the bearing pressure elements are arranged as to direction, and adjusted as to strength, so as to apply the minimum but always great stress necessary for perfect noiseless contact of the bearings while having relatively small effect in opposing or helping pivotal movements. The restoring springs, on the other hand, are arranged to act as directly as possible in opposing displacement and assisting restoring movements of the lever; while the third resilient element, the diaphragm, is preferably associated in the combination so that its resilient movement will harmonize with the resilient movements of the lever, with slight or minimum tendency for either to oppose or assist the movements of the other.

An important feature of my present invention is special means whereby the bearing pressure is applied not only directly downward in the plane of the pivotal axis but also substantially in the line of said axis. As before explained, this makes it possible to employ a very short stiff spring element as one of the elements of the bearing pressure means; or, if desired, to make all of the bearing pressure elements as rigid as the elasticity of the steel will permit.

In some respects, therefore, my present disclosure and claims are broader than in said prior application, particularly as regards the use of restoring springs in combination with bearing pressure means in which the high pressure on the bearings is without restoring spring effect even though rigidly applied without the use of bearing springs.

The above and other features of my invention may be more fully understood from the following description in connection with the accompanying drawings, in which.

Figure 1:
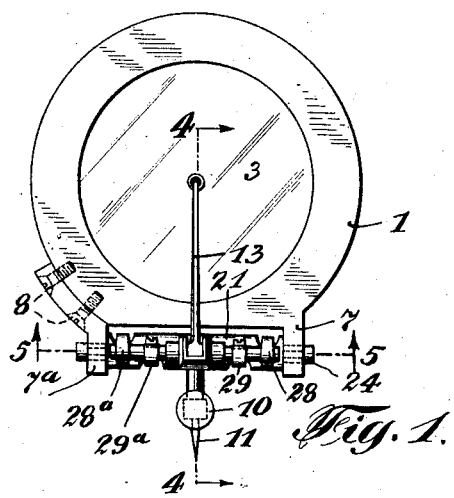
Fig. 1 is a face elevation of a reproducer sound box showing one form of my invention applied thereto.
Figure 2:
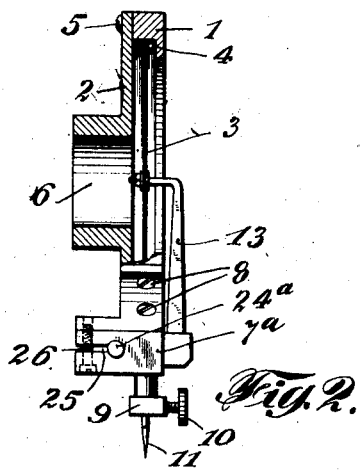
Fig. 2 is an edge elevation partly in sections.
Figure 3:
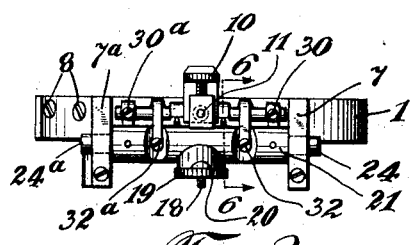
Fig. 3 is an edge view corresponding to Fig. 1 viewed from below.
Figure 4:
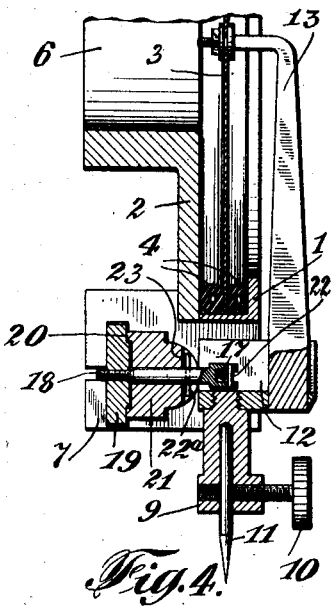
Fig. 4 is an enlarged section on the line 4—4, Fig. 1.

The sound box comprises casing 1, in which is clamped by cover plate 2, the diaphragm 3 between tubular rubber gaskets 4 which may be of the usual construction conforming to present-day practice. The cover-plate 2 is secured by screws 5 and has the usual sound outlet 6 adapted to communicate with the tone arm of a phonograph when used for reproducing.

The casing 1 has one pivot bracket 7 rigid therewith, the other bracket 7ª being a separate piece secured by screws 8. The above-described parts of the apparatus are substantially the same in all figures of the drawing.

Figure 5:
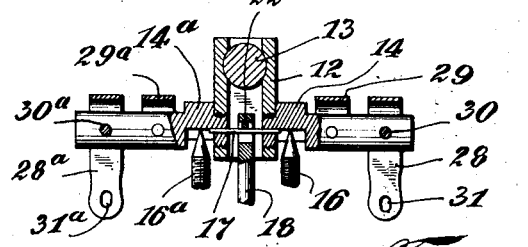
Fig. 5 is a detail view partly in section on the line 5—5, Fig. 1.
Figure 6:
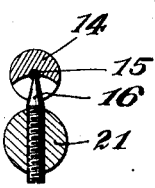
Fig. 6 is a detailed section on the line 6—6, Fig. 3.

The diaphragm lever has the usual socket piece 9 and binding screw 10 for holding needle 11, when the device is a reproducer, or equivalent cutting tool, when the device is a recorder. The socket member preferably has its axis in the plane of the diaphragm, when the diaphragm is employed, and the pivotal axis is preferably in the same plane. These relations require offset of the long arm of the lever, which is accomplished in the present case by having socket member 9 screw threaded to a U shaped box member 12, the legs of which embrace the long arm 13 as shown in Fig. 5, the latter being preferably secured by a drive fit assisted, if desired, by upsetting of the metal in the socket. This box member 12 has a cross-bar which may consist of two separate members 14, 14ª screw threaded therein as indicated in Fig. 5. In these cross-bar members are formed axial concave bearing surfaces 15, which engage and rock upon the points of pointed steel screws 16, 16ª. These concave surfaces are formed by drilling the bar members outwardly from the longitudinal axis of the lever and the registering inner ends of the drill holes also afford a closely fitting support for a transverse steel member 17, which may be a short length section of steel needle capable of minute deflection under great stress or it may be rigid as by a rigid backing of larger diameter or shorter length or by making it of tool steel. The upper surface of this needle naturally lies exactly in the pivotal axis and it is made to act as a bearing spring by applying transverse stress thereon by means of a screw tension bar 18, which can be tensioned as powerfully as may be desired by nut 19 bearing against boss 20 on anchorage bar 21. This transverse thrust on steel member 17 is preferably applied through another steel member 22 secured in the upper end of tension member 18, at right angles to said member 17. The crossing steel members afford an approximate point contact substantially at the pivotal axis. Any movement that may occur at this point will be a rocking movement free from any scraping or chattering and hence noiseless. Preferably tension member 18 is keyed by means of cross-pin 22ª engaging slot 23 in anchorage bar 21. As this same anchorage bar forms the support for the stationary cone bearings 16, 16ª, it is evident that the directions of thrust and tension are relatively fixed in a single plane and their points of application in a single line of that plane.

The anchorage bar has trunnions 24, 24ª, fitting in bearings which are split as at 25 and are provided with a screw 26 which may be operated to bind and lock said trunnions or to release the same at will. As before explained, this permits of turning the entire vibratory system (exclusive of the diaphragm when desired) around the center of the anchorage bar 21. In this manner, the hereinbefore described initial position of the long end of the stylus bar can be secured. After the attachment of the diaphragm 3 to the stylus bar 13 is made and when the said diaphragm is forced to its permanent place between the gaskets 4, the movement of the diaphragm causes the stylus bar and everything connected with it, to move around the axis of the anchorage bar 21, leaving the diaphragm as a relatively true plane surface without stress of any kind. The trunnions 24 and 24ª can then be locked in fixed position by the screws 26. Following this locking of the trunnions, a relatively true initial tension can be imposed upon the diaphragm in either direction if desired, by means of the restoring springs 28, 28ª, or 29, 29ª.

The restoring spring function is performed by springs 28 and 28ª, applying tension in one direction, and springs 29 and 29ª, applying tension in the opposite direction, circumferentially about the pivot bar 21. These springs are J shaped, having the shorter ends encircling the pivot bar and rigidly secured thereto by screws 30, 30ª. The longer arms are provided with slotted apertures 31, 31ª having adjustable clamp screws 32, 32ª extending therethrough freely, that is, without engagement of the screws with the sides of the slots.

With the above arrangement, the bearing spring pressure may be relatively enormous without producing any restoring spring effect. The restoring springs may therefore be adjusted to the required delicacy. In practice the lever, pivot bar and anchorage bar springs and diaphragm are first assembled in approximately the position shown, with the screws 26 loosened so that the diaphragm may rest in a position substantially plane and free from buckling stress. The clamping cover 2 is then screwed down to secure the same. Clamping screws 26 are then tightened to prevent further shift of anchorage bar 21. Then the screws 32, 32ª are carefully adjusted for desired opposing tension of the restoring springs, said tension being preferably such as to carry the load represented by the inertia of the lever and making it self-restoring to the extent and with the power best adapted to accommodate maximum undistorted swing of the diaphragm 3. This results in a controlled elastic vibration of the lever within the limits of non-distorting vibration of the diaphragm and without the usual inertia tendency of the lever to force the diaphragm to distorted positions, thereby preserving the faithful record of the mechanical swings in accord with the true variations of the sound waves which are being mechanically transmitted through the lever.

I claim:

1. A vibration translating device including a lever, members affording bearing surfaces upon which said lever is fulcrumed and means for actuating said lever at frequencies corresponding to sound waves, in combination with restoring spring means resiliently opposing the vibratory movement of the lever, and bearing spring means acting approximately in the plane of the pivotal axis of the lever to maintain the bearing surfaces in intimate non-slip contact, but substantially without restoring spring effect upon said lever.

2. A sound box including a diaphragm and a lever, members affording bearing surfaces upon which said lever is fulcrumed, in combination with restoring spring means independent of the diaphragm for resiliently opposing the vibratory movements of the lever in both directions and bearing spring means acting approximately in the plane of the pivotal axis of the lever to maintain the bearing surfaces in intimate non-slip contact, but substantially without restoring spring effect upon said lever.

3. A sound box including a diaphragm and a lever attached thereto and members affording bearing surfaces upon which said lever is fulcrumed, in combination with powerful resilient means maintaining the bearing surfaces in intimate non-slip contact but substantially without resilient effect circumferentially of the axis of the lever, and separate therefrom, adjustable resilient means independent of the diaphragm for resiliently opposing in both directions vibratory movements of the lever about said axis.

4. A sound box including a diaphragm and a lever attached thereto and members affording bearing surfaces upon which said lever is fulcrumed, in combination with powerful resilient means maintaining the bearing surfaces in intimate non-slip contact but substantially without resilient effect circumferentially of the axis of the lever, a plurality of other resilient elements separate from said resilient means, with independent adjusting means for resiliently opposing vibratory movements of the lever about said axis in both directions.

5. A sound vibration translating device including a diaphragm, a box member and a lever attached to the diaphragm and having surfaces pivotally bearing on said box member, in combination with bearing spring means for maintaining the lever in intimate contact with the bearing surfaces, and restoring spring means for resiliently opposing vibratory movements of the lever about its fulcrum on the box member in both directions, the bearing spring means having relatively small restoring spring resilience and the restoring spring means having relatively small bearing spring resilience, for the purpose described.

6. A sound box including a diaphragm, a lever, members affording bearing surfaces upon which said lever is fulcrumed in combination with resilient means acting to ensure continuous intimate contact of said bearing surfaces, said resilient means being arranged to afford small resilient opposition to pivotal movements of the lever; and other resilient means separate from that above mentioned and from the diaphragm, arranged to afford substantial resilient opposition to said pivotal movements in both directions for the purpose described.

7. A sound box including a diaphragm, a lever, members affording bearing surfaces upon which said lever is fulcrumed in combination with resilient means acting to ensure continuous intimate contact of said bearing surfaces, said resilient means being arranged to afford small resilient opposition to pivotal movements of the lever, and other means arranged to afford relatively great resilient opposition to pivotal movements in both directions of the lever, and means for adjusting the resilience of the one means substantially independently of the resilience of the other.

8. A sound box including a diaphragm, a lever, members affording bearing surfaces upon which said lever is fulcrumed in combination with resilient means acting to ensure continuous intimate contact of said bearing surfaces, said resilient means being arranged to afford small resilient opposition to pivotal movements of the lever, together with a separately adjustable spring arranged to afford any desired degree of resilient opposition to pivotal movements in both directions of the lever, the pressure of said first-mentioned resilient means being independent of the changes of adjustment of said spring.

9. A vibration translating device including a diaphragm, a lever attached to said diaphragm, bearing surfaces on which said lever is fulcrumed and means for actuating said parts at frequencies corresponding to sound waves, in combination with restoring spring means independent of the diaphragm resiliently opposing the vibratory movement of the lever in both directions, and bearing spring means, independent of said restoring spring means, applying relatively great pressure approximately in the line of the pivotal axis of the lever to maintain the bearing surfaces in intimate non-slip contact, but substantially without restoring spring effect upon said lever.

10. A vibration translating device including a diaphragm, a lever attached to said diaphragm, bearing surfaces on which said lever is fulcrumed and means for actuating said parts at frequencies corresponding to sound waves, in combination with restoring spring means independent of the diaphragm resiliently opposing the vibratory movement of the lever in both directions, and bearing spring means, independent of said restoring spring means, applying relatively great pressure through point contact approximately in the line of the pivotal axis of the lever to maintain the bearing surfaces in intimate non-slip contact, but substantially without restoring spring effect upon said lever.

11. A vibration translating device including a lever, bearings upon which said lever is fulcrumed and means for actuating said lever at frequencies corresponding to sound waves, in combination with restoring spring means resiliently opposing the vibratory movement of the lever, crossing members having point contact and means for applying pressure therethrough approximately in the line of the pivotal axis of the lever to maintain the bearings in intimate non-slip contact.

12. A sound box including a casing, a diaphragm and a lever, bearings upon which said lever is fulcrumed in combination with restoring spring means independent of the diaphragm for resiliently opposing the vibratory movements of the lever in both directions, means including a stiff steel member having a contact point located approximately in the pivotal axis of the lever and an approximately rigid tension means for applying powerful pressure to transversely stress said stiff steel member to maintain the bearings in intimate non-slip contact, but without flexing said stiff member substantially away from said axis, and substantially without restoring spring effect upon said lever.

13. The sound box including a casing, a diaphragm, a lever attached thereto and bearings carried by the casing upon which said lever is fulcrumed, in combination with pressure means comprising substantially rigid pivotal elements and tensioning means maintaining the bearings in intimate non-slip contact substantially without resilient effect circumferentially of the axis of the lever, adjustable resilient means separate from said tensioning means and independent of the diaphragm for resiliently opposing in both directions vibratory movements of the lever about said axis.

14. A sound box including a casing, a diaphragm, a lever attached thereto and bearings carried by the casing upon which said lever is fulcrumed, in combination with pressure means maintaining the bearing surfaces in intimate non-slip contact but substantially without resilient effect circumferentially of the axis of the lever, adjustable resilient means separate from said pressure means and independent of the diaphragm for resiliently opposing vibratory movements of the lever about said axis, and a single anchorage element on said casing turnable about an axis parallel with the pivotal axis of the lever but provided with locking means whereby said anchorage element is normally held rigid with said casing, said bearings, said pressure means and said resilient means being secured to said anchorage element.

15. A sound box including a casing, a diaphragm and a lever attached thereto, in combination with pivotal bearings comprising stationary and movable elements and pivot springs therefor, a single anchorage element on said casing, said element being turnable about an axis parallel with the pivotal axis of the lever and means for locking said element whereby it may be held rigid with said casing, the stationary elements of the bearings and said springs being secured to said anchorage element.

16. A sound box including a casing, a diaphragm, a lever attached thereto, an anchorage bar supported from the casing, sharp topped screws positioned within said anchorage bar and affording bearing surfaces upon which said lever is fulcrumed, pressure means maintaining the bearing surfaces in intimate non-slip contact but without resilient effect circumferentially of the axis of the lever and separate therefrom, two pairs of resilient elements each independently adjustable for resiliently opposing vibratory movements of the lever about said axis in both directions, and having a stationary anchorage upon said anchorage bar, said anchorage bar being adjustable about an axis at right angles to the plane of vibration of the lever, and a pivot bar rigid with the lever and parallel with said anchorage bar, the cooperating bearing surfaces and anchorages for the lever being on said pivot bar.

17. A vibration translating device including a lever, spaced apart bearings, upon which the lever is fulcrumed and means for actuating said lever at frequencies corresponding to sound waves, in combination with restoring spring means resiliently opposing the vibratory movement of the lever, and means applying pressure at a point between said spaced apart bearings and approximately in the line of the pivotal axis of the lever to maintain the bearing surfaces in intimate non-slip contact, but substantially without restoring spring effect upon said lever.

18. A vibration translating device including a lever, spaced apart bearing screws upon which the lever is fulcrumed and means for actuating said lever at frequencies corresponding to sound waves, in combination with restoring spring means resiliently opposing the vibratory movement of the lever, and a tension screw device between and parallel with the bearing screws applying pressure through point contact approximately in the line of the pivotal axis of the lever to maintain the bearing surfaces in intimate non-slip contact, but substantially without restoring spring effect upon said lever.

19. A vibration translating device including a lever having a bearing surface, spaced apart bearing screws in contact with said bearing surface and upon which said lever is fulcrumed, and means for actuating said lever at frequencies corresponding to sound waves, in combination with restoring spring means resiliently opposing the vibratory movement of the lever, and a tension screw device between said bearing screws comprising a cylindrical steel member in the plane of said lever, a cylindrical steel member associated with the lever bearing surface and positioned at right angles to said plane and approximately in the line of the pivotal axis of the lever, said second steel member receiving pressure from said first steel member to maintain the bearings in intimate non-slip contact, but without restoring spring effect upon said lever.

20. A sound box including a casing, a diaphragm, a lever, spaced apart bearing screws upon which the lever is fulcrumed, in combination with restoring spring means independent of the diaphragm for resiliently opposing the vibratory movements of the lever in both directions and bearing pressure means including a short stiff steel member having a portion of its length free for transverse tension under transverse stress, located approximately in the plane of the pivotal axis of the lever; and a tension member for transversely stressing said free portion of said stiff steel member to maintain the bearing surfaces in intimate non-slip contact, substantially without restoring spring effect upon said lever.

21. A sound box including a casing, a diaphragm, a lever attached thereto and bearings upon which the lever is fulcrumed carried by the casing, in combination with means applying powerful pressure in the pivotal axis of the lever and maintaining the bearing surfaces in intimate nonslip contact, substantially without resilient effect circumferentially of the axis of the lever, and separate therefrom, adjustable resilient means independent of the diaphragm for resiliently opposing in both directions vibratory movements of said lever about said axis.

22. A sound box including a casing, a diaphragm, a lever attached thereto and bearings carried by the casing upon which the lever is fulcrumed, in combination with pressure means maintaining the bearing surfaces in intimate non-slip contact but substantially without resilient effect circumferentially of the axis of the lever, and separate therefrom, adjustable resilient means independent of the diaphragm for resiliently opposing in both directions vibratory movements of the lever about said axis, and a single anchorage element on said casing turnable about an axis parallel with the pivotal axis of the lever but adapted to be locked and held rigid with said casing, said resilient means being secured to said anchorage element.

23. A sound box including a casing, a diaphragm and a lever attached thereto, in combination with pivotal bearings and pivot springs therefor, a single anchorage element on said casing, said element being turnable about an axis parallel with the pivotal axis of the lever and locking means whereby said anchorage element is normally held rigid with said casing, said springs being secured to said anchorage element.

Signed at Buffalo in the county of Erie and State of New York, this 31st day of July, A. D. 1923.

ELWOOD GRISSINGER.